May 29, 1956 S. A. MOREHOUSE 2,747,332
FLOWER POT WATERING DEVICE
Filed June 15, 1953
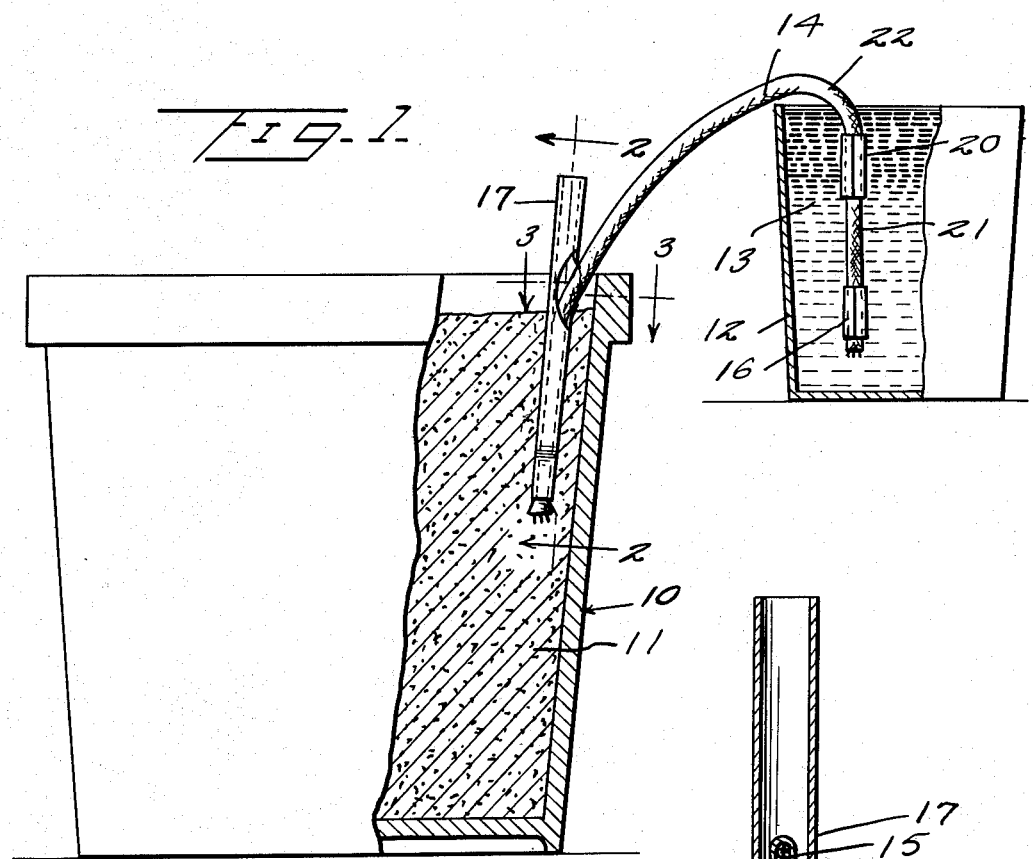
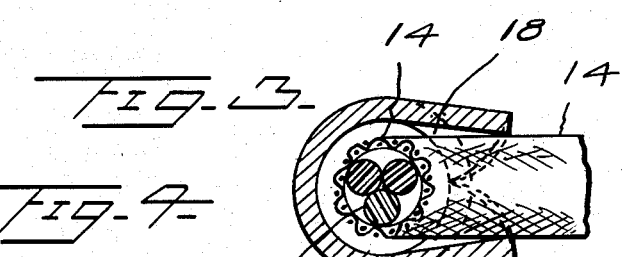
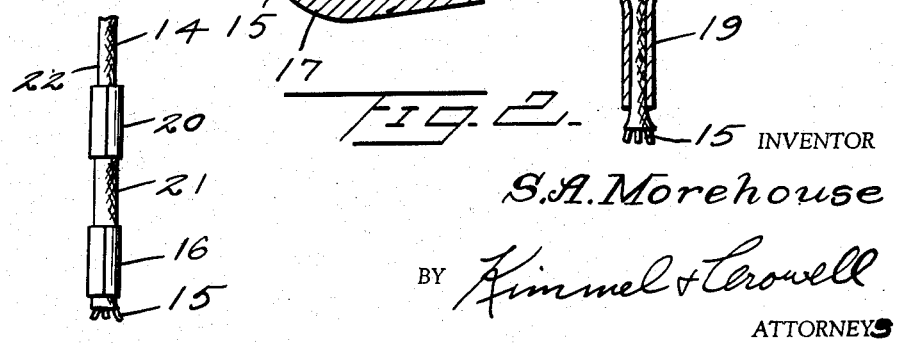
INVENTOR
S. A. Morehouse
BY Kimmel & Crowell
ATTORNEYS

United States Patent Office 2,747,332
Patented May 29, 1956

2,747,332

FLOWER POT WATERING DEVICE

Silas A. Morehouse, Dayton, Ohio

Application June 15, 1953, Serial No. 361,489

1 Claim. (Cl. 47—38)

This invention relates to a flower pot watering device.

An object of this invention is to provide a flower pot watering device which will provide continuous moisture for the dirt in the pot in a quantity sufficient to maintain growth of the plant.

It is well known that in many instances plants of various kinds are maintained in a house and these plants which are in flower pots require frequent if not daily watering. When the plants are left unattended for extended periods of time due to the absence of the members of the household, the plants usually die. It is, therefore, an object of this invention to provide a watering means which will automatically feed water to a flower pot so that the lack of attention for relatively long periods will not result in injury or dying of the plant.

In the carrying out of this invention, a wick element is provided which has one end inserted in a water receptacle and the other end projected into the dirt in the flower pot. The wick will provide means under capillary action whereby the water in the receptacle will gradually flow from the receptacle to the flower pot. The device herein disclosed includes not only a wick for transferring the water from the receptacle to the flower pot, but also a means for regulating the flow of the water in addition to a means for securing the extended wick in the dirt.

Another object of this invention is to provide in a device of this kind, a relatively flexible capillary element and means interiorly of the element for preventing collapsing of the element.

With the above and other objects in view, my invention consists in the arrangement, combination and details of construction disclosed in the drawing and specification, and then more particularly pointed out in the appended claim.

In the drawing:

Figure 1 is a detailed side elevation of a flower pot watering device, constructed according to an embodiment of this invention showing the device in operative position with respect to a receptacle and flower pot which are shown broken away and partly in section.

Figure 2 is a sectional view on an enlarged scale taken on the line 2—2 of Figure 1.

Figure 3 is a fragmentary sectional view taken on the line 3—3 of Figure 1.

Figure 4 is a fragmentary side elevation of a portion of the device showing the regulating means in restricted position.

Referring to the drawings, the numeral 10 designates generally a flower pot containing dirt 11. A water receptacle 12 containing water 13 is disposed in a position somewhat elevated from the pot 10.

In order to provide a means whereby the water 13 in the receptacle 12 will be transferred in a continuous process to the dirt 11 in the pot 10, I have provided an elongated fibrous transfer member 14. The transfer member 14 is formed out of fibrous material such as cotton or the like and is herein shown as a tubular member. The transfer member 14 has disposed interiorly thereof, a plurality of non-absorbent and relatively flexible stiffening elements 15 which provide a means for holding the transfer element 14 against collapsing when the transfer element is saturated with water.

One end of the transfer element 14 has secured thereto a metal band 16 which is extended about the transfer element 14 and tightly holds this element to the stiffening elements 15. The band 16 is preferably disposed a short distance inwardly from the adjacent end of the transfer element 14.

A tubular stake and guide member 17 is adapted to be projected into the dirt 11 and is provided with an opening 18 between the ends thereof, whereby the transfer element 14 may be extended downwardly into the guide and stake member 17. The lower end of the guide and stake member 17 is constricted or pinched together as indicated at 19 so as to firmly hold the transfer element 14 with the stiffening elements 15 against movement relative to the guide and stake member 17.

As shown in Figures 1 and 2, the adjacent end of the transfer element 14 projects downwardly a slight distance below the constricted end 19 of guide and stake member 17. In order to provide a means whereby the quantity of water being transferred from the receptacle 12 to the flower pot 10 may be regulated, I have provided a second metal band 20 which is disposed about the transfer member 14 at a point spaced upwardly from the band 16. The band or member 20 engages relatively tightly about the transfer element 14 so that the member 20 may be moved toward or away from the band 16 to either effect expanding of the transfer member 14 between regulating member 20 and the stake or guide 17 or to effect a constriction or reduction in the diameter or size of the transfer member 14 so that the flow of water through the portion 22 may be regulated.

In Figure 1, that portion 21 of the transfer member 14 between the member 20 and band 16 is substantially smaller in diameter than that portion 22 of the transfer member 14 which is positioned between the regulating member 20 and the stake or guide 17. With the regulating member 20 in the position shown in Figure 1, a maximum amount of water will be transferred from receptacle 12 to the dirt 11 in pot 10.

In the event it is desired to slow down the transfer of water from the receptacle to the pot, the member 20 is moved toward band 16 as shown in Figure 4, thereby expanding or enlarging the transfer portion 21 and reducing the diameter of the transfer portion 22.

In the use and operation of this device, the receptacle 12 is filled with water 13 and supported at a point where the water level is above the top of the flower pot 10. The stake and guide member 17 is projected into the dirt 11 and preferably, the stake or guide 17 is positioned closely adjacent the plant so that the moisture transferred by the transfer element 14 will enter the dirt close to the roots of the plant. The opposite end bearing the band 16, the member 20 and a portion of the transfer portion 22 is then extended into the water and if an immediate flow of water is desired, the entire transfer element 14 may be initially saturated with water. The water 13 will flow by capillary action through the transfer element 14 into the guide 17 and from the lower end of guide 17 the water will enter the dirt 11.

It will, of course, be understood, that a number of these devices may be used in a single receptacle with the flower pots arranged about the receptacle so that a relatively large receptacle will provide moisture for a series of pots. This device will transfer the water from the receptacle 12 at a rate sufficient to maintain the dirt 11 moist and the rate of flow of the water can be adjusted by expanding and contracting the portion 22.

With the use of this device, a flower pot may be left unattended for a relatively long period of time and the plant in the flower pot will be kept alive and growing in a normal condition.

What is claimed is:

A flower pot watering device comprising an elongated tubular fibrous absorbent member, a relatively flexible non-absorbent stiffening means in said member, a metal band about one end of said member tightly securing said one end of said member relative to said stiffening means and constituting a non-buoyant means for holding said one end submerged in water, a rigid tubular dirt piercing member having an opening between the ends thereof, said fibrous member extending loosely through said opening and projecting below one end of said dirt piercing member, said one end of said dirt piercing member being constricted to tightly secure said fibrous member thereto, and a second band about said fibrous member fixed relative thereto and spaced from said first band, said second band being adjustable relative to said stiffening means by movement lengthwise thereof and being held in each adjusted position by friction between said stiffening means and the portion of the fibrous member which said band surrounds whereby to contract or expand that portion of said fibrous member between said second band and said dirt piercing member to thereby regulate the capillary flow of water along said fibrous member.

References Cited in the file of this patent

UNITED STATES PATENTS

| | | |
|---|---|---|
| 62,657 | Martine | Mar. 5, 1867 |
| 399,277 | Mueller | Mar. 12, 1889 |
| 880,968 | Bunker | Mar. 3, 1908 |
| 1,400,628 | Rudolph | Dec. 20, 1921 |
| 2,491,124 | Martin | Dec. 13, 1949 |